April 23, 1935.  W. V. D. KELLEY  1,998,584
FILM PACK CONSTRUCTION
Filed July 22, 1933
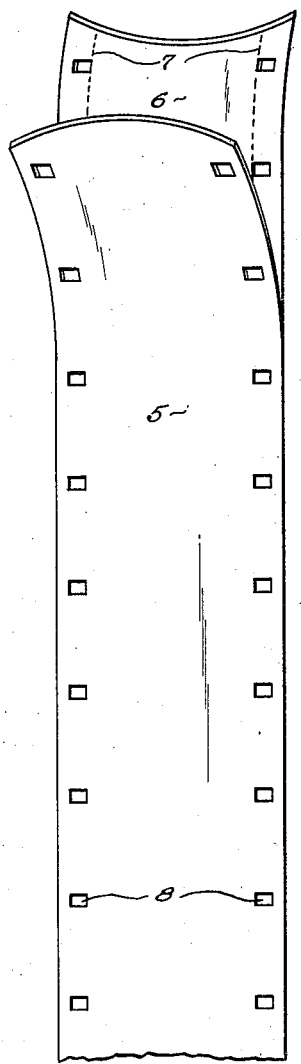
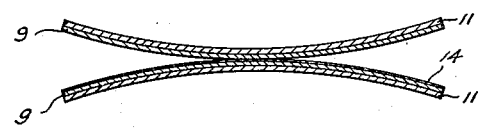
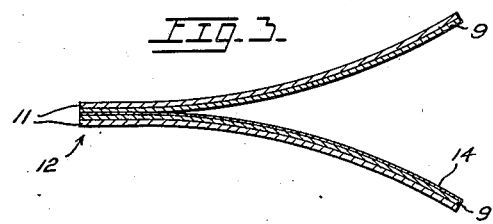
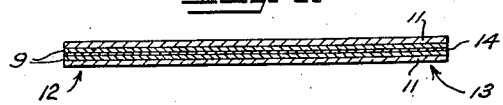
Inventor;
William V. D. Kelley,
per Arthur J. Farnsworth
Attorney.

Patented Apr. 23, 1935

1,998,584

UNITED STATES PATENT OFFICE 1,998,584

FILM PACK CONSTRUCTION

William V. D. Kelley, Los Angeles, Calif., assignor to Color-Photo, Inc., Los Angeles, Calif., a corporation of California Application July 22, 1933, Serial No. 681,734

5 Claims. (Cl. 95—2)

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to bi-pack and multi-pack photographic film, and particularly to films of this nature that are adapted for cinematography.

In certain processes of photography, it is convenient to employ superposed films; as, for instance, in color cinematography. In such uses it has been necessary hitherto, to employ special equipment, that is adapted for this particular purpose. Such equipment has required double the usual number of film reels, and double the number of many of the parts required for the operation of single films. Even so, difficulties are encountered, such as: the problem of maintaining perfect registration of superposed films; avoidance of "creeping" or "buckling" of the films where they run over cylindrical surfaces; and prevention of injury to the delicate surfaces of the films; by reason of slippage between them when they are in contact.

In such uses as cinematography, films are always handled coiled, except when they are being run through the apparatus, and over cylindrical surfaces for exposure or projection purposes. Therefore it is obvious that, by reason of differences in radius, superposed films as they have hitherto been used, cannot be kept in perfect registration throughout considerable portions of their lengths. This difficulty can be reduced somewhat, by using very thin films, but it cannot be wholly overcome in this way. The outer film, by reason of its greater radius where it passes over cylindrical surfaces, necessarily must creep with respect to the underlying film; or the underlying film must buckle from time to time to compensate for the greater length of the outer film. Either of these things is highly objectionable. Creeping of the films while they are in contact, is likely to cause abrasions and scratches on their delicate surfaces. Buckling also results, more or less, in rubbing the delicate surfaces together, but its chief objection is its interference with running the films through apparatus; and it will require greater space in magazines, and greater clearances throughout the paths of travel.

In view of what just has been said concerning the present state of the art, the principal objects of my invention are; first, to provide a bi-pack, or multi-pack, photographic film structure, which may be handled and used as a unit in the same manner as single film, and in such equipment as is commonly employed for single films in the photographic and cinema arts; second, to supply a bi-pack or multi-pack photographic film in which the component films are positively prevented from mutual displacement, as by creeping or otherwise, until it is desired to separate them; third, to secure a bi-pack or multi-pack photographic film that may be coiled, or be run over cylindrical surfaces, without buckling of the component films; fourth, to provide a bi-pack or multi-pack cinema film wherein the sprocket perforations of the component films are precisely alike in every respect, including location, so that they may be used to secure perfect registration of the components at all times; fifth, to provide means whereby superposed films are constrained to remain in perfect contact throughout the entire extent of their opposed surfaces in all ordinary uses, so long as this is desired; sixth, to secure the aforesaid advantages in a bi-pack or multi-pack film construction, wherein the component films may be easily separated from each other, without injury to either of them; seventh, to secure the results now attainable in cinematography by the use of superposed separate films, without the necessity for employing extra magazines, special equipment, or additional parts of any kind; and, eighth, to accomplish the stated objects by means of very simple, inexpensive, and dependable means. My objects are attained in the manner illustrated in the accompanying drawing, in which—

Figure 1 is an elevation of a bi-pack film embodying my invention, with the component films partially separated;

Figure 2 is a diagram on a greatly enlarged and distorted scale, illustrating, in cross-section, the normal shape of the superposed component films used in my improved construction, and the first step in the process for assembling them;

Figure 3 is a similar enlarged and distorted diagram in cross-section, illustrative of the second step of my process for producing a bi-pack film. For certain purposes, a composite film constructed in the manner shown in Fig. 3, will be entirely satisfactory, so that this figure may be considered as illustrating the final step of the process when the composite film is intended for special purposes; and Figure 4 is a similar diagrammatic cross-section of my completed bi-pack construction, as it is ordinarily used, and is illustrative of the final step of the construction process, succeeding the steps illustrated in Figs. 2 and 3.

Similar reference numerals refer to similar parts throughout the several views.

Explaining more in detail what has been outlined above, the usual practice in such arts as color cinematography requires running two separate superposed films through the projection machine in contact, emulsion to emulsion. This necessitates fitting the projection apparatus with double the number of reels required for single films, the use of two separate take-ups, and requires supplying two separate feeding means. The take-ups and feeding means may, of course, be constructed as a single unit; but, even in such a case, there is the objection that it involves special, and not standard, apparatus, and requires more space. The herein disclosed method of handling superposed films on single reels has not been used hitherto, because it has not been considered to be practical for several reasons. Two independent superposed films will not roll up in a coil without buckling, unless they are allowed to slip upon each other as they are being coiled. Obviously, buckling interferes very seriously with the operating mechanism; and, if films are allowed to slip upon each other to prevent buckling, there is great danger of abrading or scratching their delicate contacting surfaces. Furthermore, such superposed films, when wound, will be greatly out of registration. Perfect registration is absolutely essential during exposure or projection, and it has been the practice to employ registering dowel pins, at or adjacent the exposure gate, to accomplish this. Registering dowel pins are not required for single films; are not standard equipment; and thus are objectionable; although necessary for using superposed films in the present state of the art. The present invention provides highly satisfactory means for overcoming these difficulties.

It has been mentioned that certain of the difficulties encountered in the present use of superposed films, can be reduced by reducing the thickness of the films themselves. There is a limit to the extent that this can be done however. Although it is perfectly feasible to make films of any desired thickness within reason, the thickness cannot be reduced below a certain minimum without exceeding the limits of the mechanical strength that is required to withstand operating stresses. If the film is made too thin, it may be expected to tear at the sprocket perforations, for example. Therefore a more or less standard film thickness is in use, which permits the film to be run through cameras and projection machines safely. In other operations, such as developing, toning, and coloring, there is a much greater margin of strength to withstand the handling stresses; since very little, if any, use is made of the sprocket perforations. Therefore, much thinner films can be handled in such processes than could be handled through the mechanisms of cameras and projection machines. I have taken advantage of this principle in constructing my composite bi-pack or multi-pack unitary film. Thus, I am able to make each of the component films of my composite bi-pack construction, approximately one-half of the usual thickness, the total thickness of the composite film being about the same as that commonly employed for single films.

Passing now to a detailed description of my invention, and referring to the drawing which illustrates an embodiment thereof in a bi-pack film for cinematography, I first superpose two component films 5 and 6, each being of one-half the usual thickness. I then unite these two component films along narrow margins, as indicated by dotted lines 7, at one or both of the opposed pairs of edges. This will result in a unitary structure of double the thickness of the components, and approximately equal to the thickness of ordinary standard films. The uniting must be accomplished in such a manner that the composite structure can be separated into its component films, without injuring either of them. In carrying out this process, use is made of unperforated films, and the sprocket perforations 8 are made in the unitary structure, after the component films have been united. Thus, the location, size, and shape of corresponding sprocket holes, will be exactly alike in the two component films; and the sprocket holes may be utilized subsequently, for bringing the component films into perfect registration.

A composite film, constructed of ordinary commercial materials in the manner just indicated, is capable of passing over cylindrical surfaces, or of being formed into a coil, without buckling or creeping of the components in either case. This is for the reason that the material of the celluloid bases is highly elastic and resilient, permitting the outer component film to stretch, and the inner component film to compress, sufficiently for the purpose; particularly when the components are half the usual thickness.

The resilient and elastic qualities of the material commonly used as bases of standard films, is further utilized to insure keeping the component films in actual contact face to face, throughout the entire extent of their contacting surfaces. This is accomplished by manufacturing the component film strips so that normally they will have arcuate cross-sections, as indicated in Figs. 1, 2 and 3. The faces of the component films, i. e., their emulsions 9, are on the convex side of the film bases 11. After being united, the composite film will be flat, and the component films will be in perfect contact throughout, as indicated in Fig. 4, and the lower portion of Fig. 1. Moreover, the composite film will strongly tend to remain flat in cross-section, by reason of the internal stresses therein, resulting from the deformation of the normally arcuate cross-sections of the component films.

It is to be remarked that although I prefer to employ component films having normally arcuate cross-sections, this is not always essential if the components are perfectly flat. The normally arcuate shape of the components imparts a degree of assurance that the composite film will remain flat, and that the opposed surfaces of the components will always remain in contact. Moreover, the normally arcuate shape of the component films insures that no air will be entrapped between them, when the composite film is constructed in the manner to be described.

In case it should be desired to unite normally flat component films in the manner described, or to unite films that are normally curved in the wrong direction, i. e., those having their faces on the concave sides, it is very easy to impart the desired arcuate cross-sections to the films by treating them in well known ways, as by running them through heated calender rolls.

In the process of preparing the composite films, the first step is to position the films face to face, with their convex emulsion layers 9 in contact. The opposed edges of the component films are then united together along a narrow margin, at one side, as at 12, to produce the structure shown in Fig. 3. The result may then be used as a unitary composite film for certain purposes; or the component films may be further united along a narrow margin at their other sides, as indicated at 13, to produce the structure shown in Fig. 4.

After the composite film has been completed in the forms of Fig. 3 or Fig. 4, one or both edges having been united in the manner explained, it is run through a machine for forming the sprocket perforations 8. Obviously such perforations, with respect to each of the component films, will be in perfect registration, and may be utilized for registration purposes, for re-assembling the component films.

Such a composite film may be made of the full strength of a standard film of the same thickness; and it may be operated in precisely the same manner, without any danger of buckling or creeping of the components. Moreover, it requires no special apparatus in use, and may be employed in standard cameras and projection machines.

For treating the composite film, as in developing and fixing baths, or to color it, it will be necessary to separate the component films from the composite structure. Therefore, the manner in which they are united is important. I have found that an ordinary adhesive, even such a substance as common glue, may be utilized satisfactorily for uniting the components. When it is desired to separate these, they may be stripped from one another by mechanical pulling; with or without previous softening of the glue, depending upon its characteristics. Since the glue is on narrow margins only, as indicated by dotted lines 7, stripping the component films from each other cannot injure the picture surfaces of the opposed emulsions, so that no practical injury is done to the films in such treatment. A preferred method of uniting the films may be accomplished without the use of adhesive material, other than that comprising the emulsions themselves. Thus, a narrow margin of the emulsions, along the edges of the component film, may be softened by the aid of heat, or by a suitable solvent; the films then being placed face to face in proper relation, and the margins being subjected to sufficient pressure to cause the softened gelatinous material of the opposed emulsions to coalesce. Hot water may be used for the softening process; or acetic acid, or similar solvents may be employed.

It will be apparent that my improved composite bi-pack or multi-pack film, is particularly adapted to such processes as color-photography; wherein the component films must be exposed in registering positions, separately developed and treated, separately colored, and then be re-united in the same exact registering positions. Thus, for the purpose of making negative films, a bi-pack may be employed that has an orthochromatic emulsion opposed to a panchromatic emulsion, with a suitable color-filter layer 14 therebetween. This filter layer may be merely a very thin stratum of direct or mordanted dye upon the face of one of the emulsions, and the coloring matter of the dye may be destroyed in a subsequent treating bath in well known ways. Prints from such negatives may be made according to well understood practice, and be colored as desired. The colored positives may then be assembled in registering positions in the form of the composite film illustrated in Fig. 1.

Having thus fully described my invention, I claim:

1. A pair of sensitized unexposed cinema film strips superposed face to face, and separably united at portions of their opposed margins to constitute a unitary structure; said structure having sprocket perforations therethrough, made after said uniting; the faces of said strips being gelatinous layers; and said marginal uniting being the result of softening corresponding portions of the gelatinous layers, and subsequently causing them to cohere by pressure.

2. A pair of sensitized, unexposed cinema film strips superposed face to face, and separably united at portions of their opposed margins to constitute a unitary structure; said structure having sprocket perforations therethrough, made after said uniting; the faces of said strips being gelatinous layers; and said marginal uniting being the result of softening corresponding portions of the gelatinous layers by the aid of heat, and subsequently causing them to cohere by pressure.

3. A pair of sensitized, unexposed cinema film strips superposed face to face, and separably united at portions of their opposed margins to constitute a unitary structure; said structure having sprocket perforations therethrough, made after said uniting; the faces of said strips being gelatinous layers; and said marginal uniting being the result of softening corresponding portions of the gelatinous layers by means of a solvent, and subsequently causing them to cohere by pressure.

4. A composite film of normal thickness comprising component sensitized, unexposed photographic films of less than normal thickness superposed face to face, and separably united at portions of their opposed margins to constitute a unitary structure; said structure having sprocket perforations therethrough, made after said uniting; the faces of the component films being gelatinous layers; and said marginal uniting being the result of softening corresponding portions of the gelatinous layers, and subsequently causing them to cohere by pressure.

5. A pair of sensitized, unexposed cinema film strips superposed face to face, and separably united at portions of their opposed margins to constitute a unitary structure; the faces of said strips being gelatinous layers; and said marginal uniting being the result of softening corresponding portions of the gelatinous layers, and subsequently causing them to cohere by pressure.

WILLIAM V. D. KELLEY.